United States Patent [19]

Lipman

[11] Patent Number: 5,451,281
[45] Date of Patent: Sep. 19, 1995

[54] PROCESS FOR IMPARTING SCRATCH RESISTANCE TO OPHTHALMIC LENSES DURING EDGING

[76] Inventor: Arnold Lipman, 3043 P St. N.W., Washington, D.C. 20007

[21] Appl. No.: 328,553

[22] Filed: Oct. 25, 1994

Related U.S. Application Data

[63] Continuation-in-part of Ser. No. 181,737, Jan. 18, 1994, abandoned.

[51] Int. Cl.⁶ ............................................. B32B 31/18
[52] U.S. Cl. ................................. 156/154; 156/99; 156/101; 51/284 E, 65/61
[58] Field of Search ............... 156/101, 154, 99, 323, 156/212, 252, 257, 267, 344; 451/284 E, 101 LG, 143, 277; 65/61, 37, 38, 23, ; 264/2.7; 351/166, 174

[56] References Cited

U.S. PATENT DOCUMENTS

| | | | |
|---|---|---|---|
| 3,899,314 | 8/1975 | Siegmund | 65/23 |
| 4,118,898 | 10/1978 | Godot | 264/2.7 |
| 4,156,328 | 5/1979 | Keane, Jr. | 51/284 E |
| 4,178,082 | 12/1979 | Gänswein et al. | 51/284 E |
| 4,217,736 | 8/1980 | Akaba et al. | 51/284 E |

FOREIGN PATENT DOCUMENTS

81/00536  3/1981  WIPO.

*Primary Examiner*—Michele K. Yoder
*Attorney, Agent, or Firm*—Dominik & Stein

[57] ABSTRACT

A process for imparting scratch resistance to an ophthalmic lens during the process of edging. A scratch resistance imparting film is releasably adhered to the side of the lens to which a mounting block is to be attached. An opening is provided in the film, through which the mounting block can be affixed directly to the lens.

20 Claims, 4 Drawing Sheets

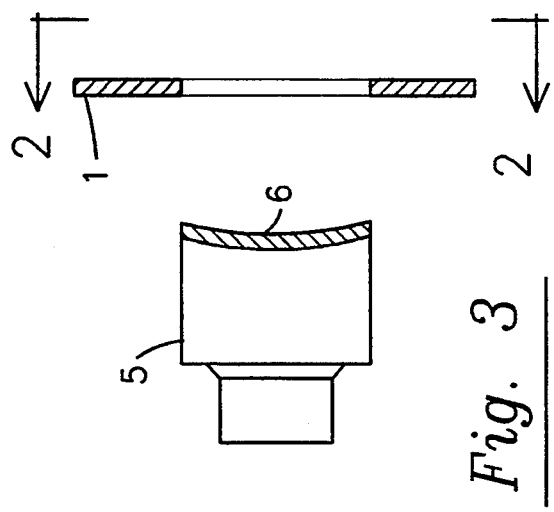
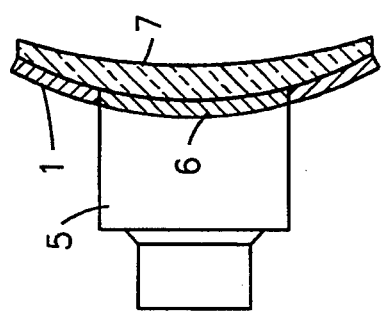
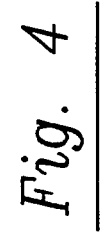
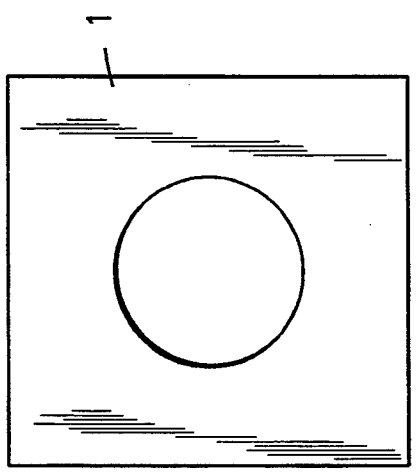
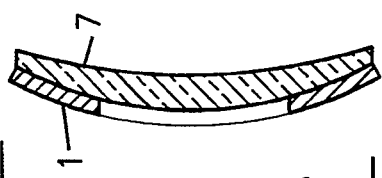
Fig. 1
Fig. 2
Fig. 3
Fig. 4

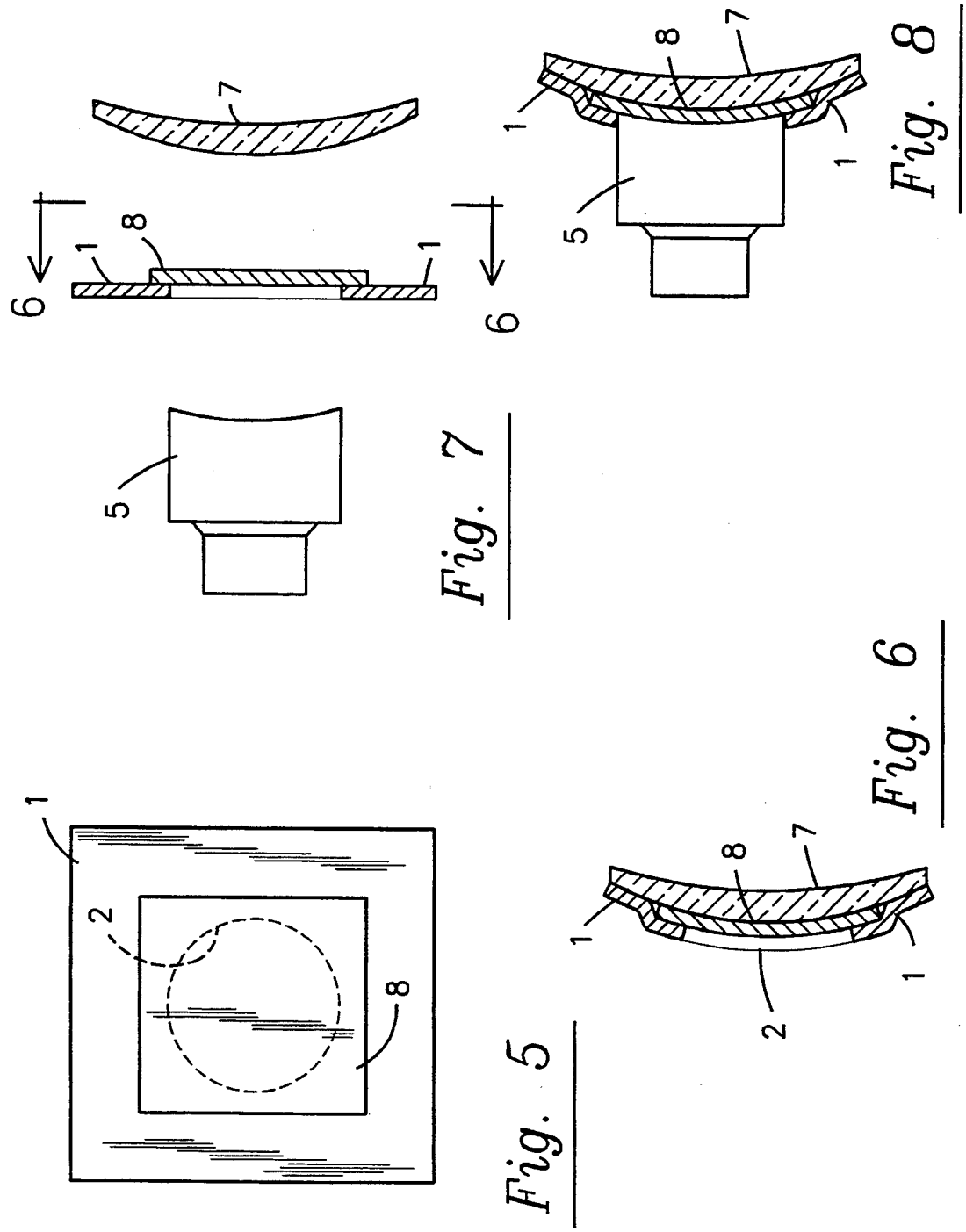

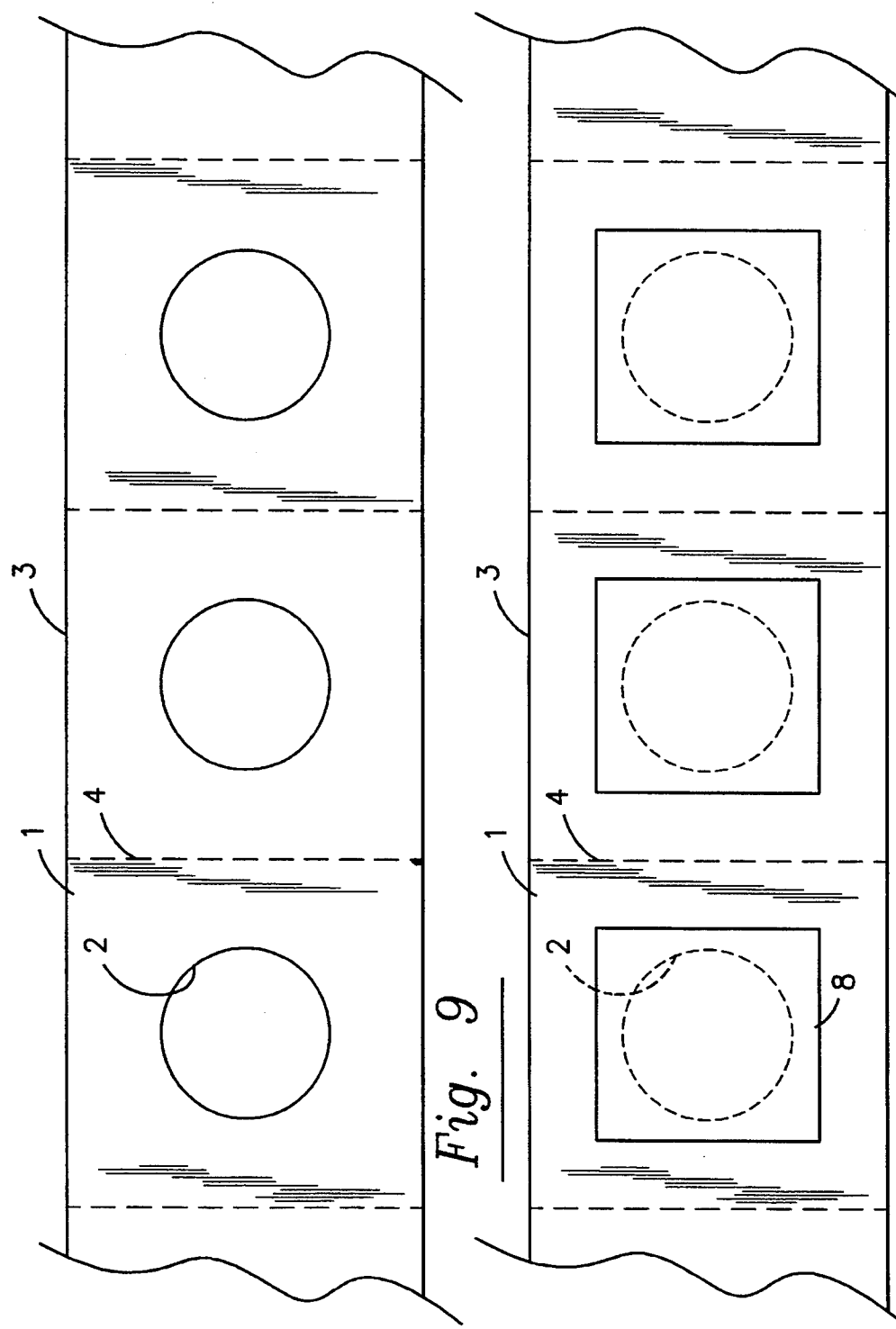

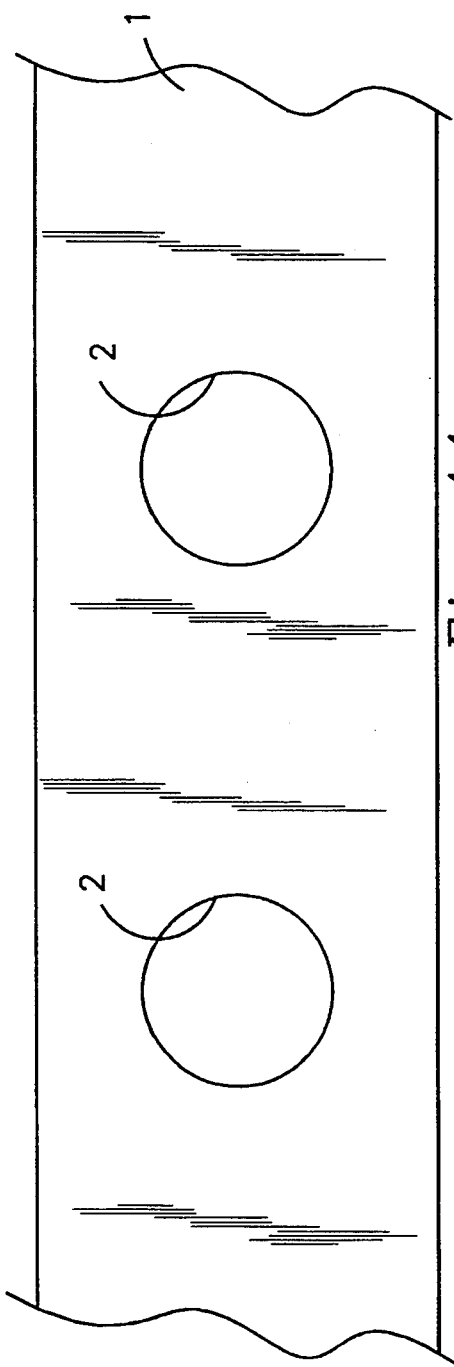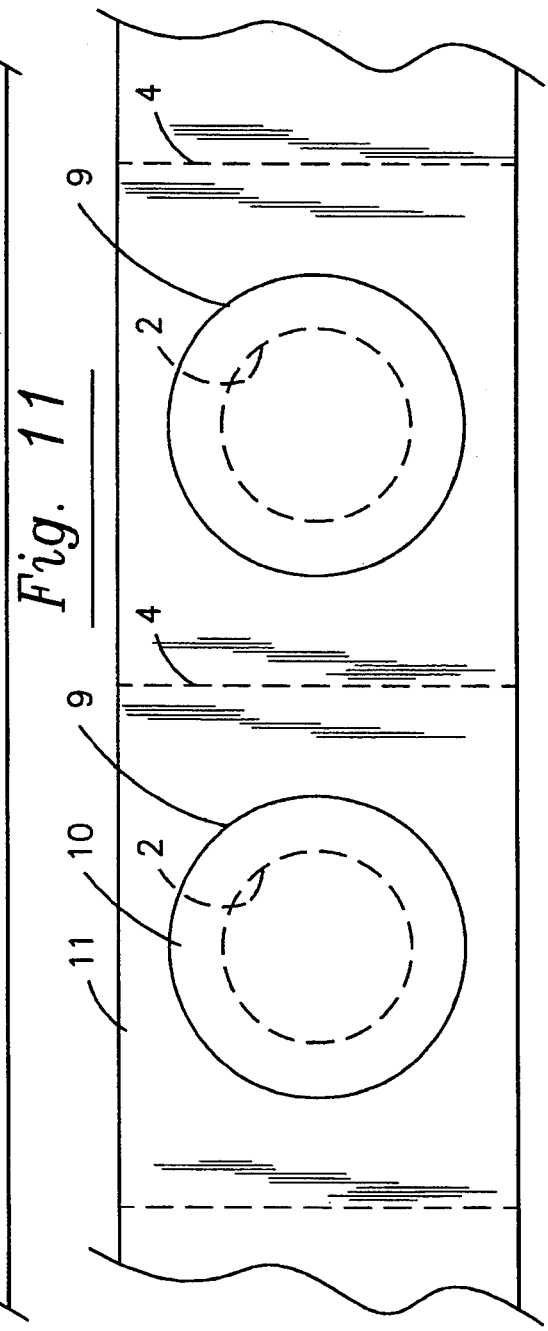

PROCESS FOR IMPARTING SCRATCH RESISTANCE TO OPHTHALMIC LENSES DURING EDGING

RELATED APPLICATIONS

This is a continuation-in-part of U.S. patent application Ser. No. 08/181,737 filed Jan. 18, 1994, now abandoned.

FIELD OF THE INVENTION

The present invention concerns a process for imparting scratch resistance to an ophthalmic lens during the process of edging, and to finished lens blanks prepared according to the process.

DESCRIPTION OF THE RELATED ART

The ophthalmic lens industry has been characterized during recent years by the use of several new types of materials for the manufacture of lenses. Unlike the lens industry of years ago when lenses were made only from glass, now eyeglass lenses are made from many different types of plastic as well. Representative examples include acrylic, PPMA (a product of PPG-Pittsburgh Plate Glass) also known as CR39, and Lexan (Polycarbonate made by General Electric).

These new plastic materials have provided the public with many benefits including the reduction in the overall weight of eyeglasses and providing UV filtration not normally available with glass lenses. However, because they are made of a much softer material, they have always been prone to scratching much more easily than glass.

Optical laboratories that were involved in producing lenses from semi-finished blanks (lens blanks with the convex side completely finished and polished and the concave side unfinished) found that many of the lenses they produced had scratches and abrasions on the pre-finished side. These scratches and abrasions were caused by debris created in the process of generating the compensating curve on the unfinished side, or the fining and polishing procedures that followed (lapping).

Some years ago, 3M Company developed a product known as "Surface Saver" which was a co-extruded plastic film about 4" wide, with a pressure-sensitive adhesive on one side and a coating on the other that was adhesive to metal. They also developed an applicator for this film which was called a "Surface Saver Applicator". The film was applied to the finished surface of lens blanks and the metal block required to be used to hold the lens in the chuck of the generator was applied as a molten indium alloy on top of the film. The top surface of the film had an affinity to the metal and provided enough of a bond to hold the lens in the chuck through the entire compensating curve generating process and the finishing and polishing process.

This material, and others made by other companies over the years, provided the necessary protection against scratching for plastic lenses during generation of the compensating curve, and was even used in making glass lenses to protect against the few such scratches found with glass processing.

After both lens surfaces have been finished, excess lens material must be cut away so that the lens can fit into a particular eyeglass frame. The cutting and beveling process is known as edging.

While the "Surface Saver" provided protection during the generating process, this product could not be successfully used during the edging process because the torque created by the edging wheel around the edge of the lens was greater than the adhesive force of the plastic film to the lens. That is, the torque would cause the plastic film between the edger's mounting block and the lens to distort, twist or disengage.

Improvements in the process of edging were also made by 3M Company who developed another set of products known by the name of "The LEAP System". This system comprised small adhesive pads made from a high density butyl rubber material, and small metal lens mounting blocks. The butyl rubber pads were self adhesive on both sides. One side of the pad was applied to the lens and a small metal block was applied to the opposite side of the pad. The metal block could then be mounted into the chuck of the edging machine for edging, and the high density nature of the butyl rubber pad prevented the torque of the grinding wheel from twisting the pad off or disfiguring it.

This system proved to be a very accurate and reliable way of edging lenses and a great improvement over previous methods, such as those which employed suction cups, which also suffered from the effects of the grinding wheel torque.

In either case, however, there was no means of protecting the lens during the edging process from scratching caused by the debris thrown off from the grinding wheel or other cutting device on the edging machine.

Further, in many cases, opticians would use the same edging machine to edge both glass and plastic lenses. Particularly in such practices, the scratching of the plastic lenses has always been a problem.

It should be noted that both semi-finished and finished lenses are available for use in the ophthalmic lens industry. Finished or premanufactured lenses (completely finished on both sides) do not require the generation of a curve on the concave side, but still must be edged in order to fit into frames. Finished lenses are about seven to ten times as frequently used as semi-finished blanks. The end users are thus particularly in need of a process for protection of finished lenses during the edging process.

It is an object of the present invention to provide a process for imparting scratch resistance to an ophthalmic lens during the process of edging.

SUMMARY OF THE INVENTION

The present invention particularly addresses the problem of imparting scratch resistance to the side of an ophthalmic lens to which the mounting block is attached during the edging operation, without in any way interfering with the attachment of the mounting block to the lens.

One embodiment of the present invention takes the form of a film having an area greater than the surface of the lens to be protected, the film being provided with an opening approximately the size and shape of the contact area between the mounting block and lens. Where the mounting block contact area is square, the opening is preferably square, and where the mounting block contact area is round, the opening is preferably round. One side of the film is adhesive for adhering to the lens material. Such a film can be easily applied manually or automatically to the lens either before or after the attachment of the mounting block.

Another embodiment of the present invention takes the form of a film into which an aperture is provided at least the size of the contact area between the mounting block and lens, preferably larger, over which aperture a patch of material having adhesiveness to the lens on one side and adhesiveness to the block on the other side is provided. The patch is preferably made of a high density butyl rubber or other polymeric material such as used in the LEAP system. This embodiment provides a means of applying both the protective film and the high density adhesive patch for the LEAP block simultaneously while providing protection for all the other exposed parts of the lens.

The foregoing has outlined rather broadly the more pertinent and important features of the present invention in order that the detailed description of the invention that follows may be better understood and so that the present contribution to the art can be more fully appreciated. Additional features of the invention, which will be described hereinafter, will form the subject of the claims of the invention. It should be appreciated by those skilled in the art that the conception and the specific embodiments disclosed may be readily utilized as a basis for modifying or designing other polished surface protection processes for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made the following detailed description taken in with the accompanying drawings in which:

FIG. 1 is a plan view of a single sheet of protective material provided with an opening through which the lens mounting block can contact the lens.

FIG. 2 is a side cross-sectional view showing the film along line A of FIG. 1 applied to a lens.

FIG. 3 is schematic representation of a mounting block with adhesive, a film, and a lens prior to assembly.

FIG. 4 shows the elements of FIG. 3 when assembled.

FIG. 5 shows a film as in FIG. 1, to which a mounting pad has been attached.

FIG. 6 is a side cross-sectional view showing the film and mounting pad along line B of FIG. 5 applied to a lens.

FIG. 7 is a schematic side view showing a mounting block, the film and mounting pad of FIG. 5 along line B, and a lens prior to assembly.

FIG. 8 shows the elements of FIG. 7 when assembled.

FIG. 9 shows a continuous strip of film material with perforations for separating individual sheets, and with openings through which a mounting block can contact a lens.

FIG. 10 shows a continuous strip of film material with perforations for separating individual sheets, and with contact pads provided over openings.

FIG. 11 shows a continuous strip of film material without perforations for separating individual sheets, and with openings through which a mounting block can contact a lens.

FIG. 12 shows a continuous strip of film material as in FIG. 9, and further showing weakening lines for facilitating removal of excess material.

DESCRIPTION OF THE PREFERRED EMBODIMENTS

The art of producing lenses for eye glasses is highly developed. Finished and semi-finished lens blanks and mounting blocks are well known and readily available. Techniques for fixing lens blocks onto semi-finished and finished lenses, techniques for generating lens surfaces, and techniques for edging are well known and, accordingly, are not described in detail herein. The present invention can be readily adapted for use in conjunction with any of the well known materials and techniques.

For a description of a disposable lens block made of a moldable non-metallic material, which is releasibly attached onto the front face of a lens element or blank, see U.S. Pat. No. 5,216,455 (Wylde). For a description of a mounting block of an antimony-lead low melting point alloy, see GB-A-1,134,643. For a description of low-melting metallic adhesives such as bismuth, cadmium or the like, for adhering a metal block to a lens blank, see U.S. Pat. No. 5,210,695 (Wood). For a computer guided single block mounting system for surfacing and edging of a lens blank, see U.S. Pat. No. 5,210,695 (Wood), which teaches a lens blank and block assembly which can be mounted successively in a surface generating machine, a finishing apparatus and an edging machine without reblocking. Other patents which set forth the state of the art include U.S. Pat. No. 5,148,637 (Byron), U.S. Pat. No. 5,053,971 (Wood et al), U.S. Pat. No. 4,928,439 (Ramose), U.S. Pat. No. 4,286,415 (Loreto), U.S. Pat. No. 4,203,259 (Haddock), and U.S. Pat. No. 3,750,344 (Raphael), the disclosures of which are incorporated herein by reference. The present invention can be adapted for use in conjunction with any of the above variations on the ophthalmic lens manufacturing process.

It will be readily apparent that the protective film 1 for use in the present invention may be made of any type of soft, pliable membrane which can conform to the shape of a lens, is adhesive, or is rendered adhesive, to a lens material, and is sufficiently strong to be able to inhibit the formation of abrasions and scratches on a lens material. The membrane could be a paper treated with a butyl rubber semi-liquid based compound, or it may be cellulose, but plastic films are preferred, and transparent plastic films are particularly preferred. Plastic film materials include polyvinyl chloride, polyvinyl alcohol, ethylene vinyl acetate, acrylics, polyethylene, polypropylene, and copolymers and blends.

Preferred among these as a film forming material is a low density polyethylene which is soft enough to readily conform to the contour of the lens using only a small amount of hand pressure to secure it in place. The sheet is larger in size than the surface area of the lens, and excess material may be trimmed off prior to edging. The polyethylene is either modified to have cling properties, or is provided with an adhesive on at least one side thereof by co-extrusion, spray coating, or otherwise.

Polyethylene can be easily blended or coextruded to produce various properties such as extensibilities, controlled stretch, and strength. Today most films are multi-layer materials, with the overall properties of films being determined by one or more layers of polymer, and the additives, such as cling agents, tackifiers, or slip agents. The protective film for use in the present invention may have one or more of low density (branched), and high density (linear) polyethylene. These varieties have low levels of stretch, but low density polyethylene is highly flexible. High density polyethylene has high tensile strength and stiffness. Linear low density polyethylene, on the other hand, which may also be used in the film of the present invention, is actually a copolymer of ethylene and 1-butene (with lesser amounts of 1-hexene and higher 1-alkanes to vary the density), and generally has no cling property absent an added cling agent, but has high levels of stretch an strength. Very low density polyethylene may also be used, depending upon process parameters.

Specific plastic film materials and techniques for modifying the properties of the films can be found in the following references: U.S. Pat. No. 5,114,763 (Brandt et al), U.S. Pat. No. 5,112,674 (German et al), U.S. Pat. No. 5,066,526 (German, Jr.), U.S. Pat. No. 5,059,481 (Lustig et al), U.S. Pat. No. 5,049,423 (German, Jr.), and U.S. Pat. No. 5,019,315 (Wilson), to name but a few.

The film is preferably provided in the form of a continuous film 3, with or without perforations 4 imprinted into the film for ease of separation of the film into individual sheets, and with a cut-away 2 provided in each sheet through which the mounting block can contact the lens. After the film has been applied to the lens, excess film protruding beyond the surface of the lens to be protected can simply be cut away.

The lens surface to be protected may be pretreated to improve adhesiveness properties, or it may be untreated.

The film of the present invention can be applied by means of the widely available 3M Surface Saver Applicator (in which a continuous film without perforations could be used). The film can be applied either before the LEAP pad and block are applied, since the film is provided with an opening which leaves exposed the area in which the mounting block is affixed to the lens, or the LEAP pad and block can be applied and then the protective film can be applied around the block. The opening can be any size and any shape, but considering the objects of the invention, it will be apparent that the film should cover as much as possible of the lens surface area not covered by the block or LEAP pad.

In the case that the lens block 5 is affixed directly to the lens material 7, the block can be formed of a low melting metal or alloy which is molded directly onto the lens, or a non-metallic compound which is cast onto the lens and cured, or the block may be a preformed block which is adhered to the lens with a bonding material 6 such as a polyester resin with a filler such as magnesium silicate as the adhesive. Material 6 may also be a LEAP type pad. Other glass adhesives are discussed in U.S. Pat. No. 5,102,937.

In the alternative embodiment, as shown in FIGS. 5 and 10, the LEAP pad 8 is superimposed over the opening 2 in the protective film 1, and the unitized film and pad are applied to the lens 7 as at the same time as a single unit. The film could be manufactured as a continuous film with or without perforations for separating individual sheets, with an opening in the middle of each 4" square sheet, and with a butyl rubber LEAP-type pad superimposed directly over each opening. The LEAP-type pad may be adhered to the side of the film which has been provided with the adhesive properties, or may be adhered to the side of the film opposite the side which has been provided with adhesive properties.

As an alternative to applying the film by means of a mechanical applicator, the protective film can also be applied by hand. The film, on a roll of, e.g., about 4" wide and about 110 feet in length (designed to fit the configuration of the 3M Applicator) can be produced with perforations every four inches allowing a 4" square of material to be torn off the role, and each sheet so separated can be applied to the lens by hand.

When the film is provided as a continuous film in the form of a roll, the film is preferably wound together with a sheet of release material on side of the film of adhesive material, in order to prevent successive layers of wound adhesive material from adhering to each other. Alternatively, the surface of the film opposite the adhesive surface is provided with a release layer or with release properties, so that the film can be wound upon itself and readily unwound.

The present invention may also take the form of finished lenses as conventionally supplied to opticians and optometrists, the lenses requiring only edging in order to fit into the frames selected by a customer, with the lenses of the present invention having a membrane releasably adhered to at least one side thereof, said membrane having an opening of a sufficient perimeter to permit a mounting block to be affixed directly to the lens which is exposed through said opening. The composite lens and membrane may further comprise a two-sided adhesive pad adhered directly to the lens in the area of the opening, so that a lens block can be immediately attached to the lens without unnecessary steps by the operator. In the case of adhesive pads, it is preferred that the exposed surface of the pad is covered with a release layer in order to protect the adhesive properties of the adhesive layer prior to use. The release layer can be easily pealed from the adhesive pad prior to adhering the mounting block.

After the lens has been affixed to the block, the lens is then mounted on the edger in the normal manner and the edging process continues as before. The convex surface of the lens is completely protected from scratching and the film, the pad and the block are removed after the edging has been completed.

A further preferred embodiment of the invention as shown in FIG. 12. In order to avoid the need for scissors, a razor, etc. for trimming excess material 11 from the lens after adhering the membrane, the membrane is simply provided with a "line of weakening" or weakening line 9, such that either before or after the application of the membrane to the lens excess material 11 can be easily removed along the weakening line leaving the area to be adhered to the lens to provide scratch resistance 10. The weakening line can be provided by any conventional method (as discussed in, e.g., U.S. Pat. No. 5,125,528), such as "kiss cutting" wherein a dye or punch cuts only part way through the membrane, or scouring or lancing wherein a line of dots or incisions is punched through the membrane so that the membrane will tear along the lanced line.

Obviously, the concave surface of the lens can also be protected using the same film material, except that the film for protecting the concave side need not be provided with an opening for the mounting block.

Although the process was first designed for protection of lenses during the process of finishing a lens, and thus is particularly suited for use by ophthalmists who are in the practice of finishing lenses for eyeglasses, it will be readily apparent that the process is capable of other applications, and is thus capable of use in a number of other industrial applications. Although this invention has been described in its preferred form with a certain degree of particularity with respect to the manufacture of eye glasses, it is understood that the present disclosure of the preferred form has been made only by way of example and that numerous changes in the details of structures and the steps of process may be resorted to without departing from the spirit and scope of the invention.

Now that the invention has been described,

What is claimed is:

1. A process for imparting scratch resistance to an ophthalmic lens affixed to a block during edging, the process comprising:

providing a lens to be edged, said lens having a front surface and a back surface;

releasably adhering to the front surface of said lens a membrane, said membrane having an opening in the area at which a block is to be affixed to the lens;

affixing a block to the lens through the opening in the membrane.

2. A process as in claim 1, wherein said membrane is made of a plastic.

3. A process as in claim 2, wherein said plastic is selected from the group consisting of polyvinyl chloride, polyvinyl alcohol, ethylene vinyl acetate, acrylics, polyethylene, polypropylene, and copolymers and blends thereof.

4. A process as in claim 3, wherein said polyethylene is a low density polyethylene.

5. A process as in claim 1, further comprising adhering a scratch resistance imparting membrane to the back side of said lens.

6. A process as in claim 1, wherein said block is affixed to said lens by means of an adhesive pad made from a high density polymeric material.

7. A process as in claim 6, wherein said high density polymeric material is a high density butyl rubber.

8. A process as in claim 1, wherein said membrane is provided in the form of a continuous roll comprising a plurality of said membranes.

9. A process for imparting scratch resistance to an ophthalmic lens affixed to a block during edging, the process comprising:

providing a lens to be edged, said lens having a front surface and a back surface;

releasably adhering to the front surface of said lens a composite membrane, said composite membrane comprising a film having an opening in the area at which a block is to be affixed to the lens and a pad of adherent material overlapping with said membrane and superimposed over said opening;

affixing a block to the lens by means of the adherent properties of the pad of adherent material.

10. A process as in claim 9, wherein said membrane is made of a plastic.

11. A process as in claim 10, wherein said plastic is selected from the group consisting of polyvinyl chloride, polyvinyl alcohol, ethylene vinyl acetate, acrylics, polyethylene, polypropylene, and copolymers and blends thereof.

12. A process as in claim 11, wherein said polyethylene is a low density polyethylene.

13. A process as in claim 9, further comprising adhering a scratch resistance imparting membrane to the back side of said lens.

14. A process as in claim 9, wherein said block is affixed to said lens by means of an adhesive pad made from a high density polymeric material.

15. A process as in claim 14, wherein said high density polymeric material is a high density butyl rubber.

16. A process for imparting scratch resistance to an ophthalmic lens affixed to a block during edging, the process comprising:

providing a lens to be edged, said lens having a front surface and a back surface;

releasably adhering to the front surface of said lens a membrane, said membrane having an opening in the area at which a block is to be affixed to the lens; and affixing a block to the lens through the opening in the membrane, wherein said membrane comprises a first area adjacent said opening corresponding to the area to be adhered to the lens to provide scratch resistance, a second area adjacent to the edges of said membrane defining excess material to be removed after applying said membrane to said lens, and a weakening line demarking the boundary between the first and second areas, such that the excess material can be removed along the weakening line leaving the area to be adhered to the lens to provide scratch resistance.

17. A process as in claim 16, wherein said weakening line has an outer diameter of from 1.5 to 3.5 inches.

18. A process as in claim 15, wherein said weakening line is provided by kiss cutting.

19. A process as in claim 15, wherein said weakening line is provided by intermittent perforation of said membrane.

20. A process as in claim 15, wherein said membrane is provided in the form of a continuous roll comprising a plurality of said membranes.

* * * * *